United States Patent [19]

Abe

[11] Patent Number: 5,253,333

[45] Date of Patent: Oct. 12, 1993

[54] ATTRIBUTE VALUE PREDICTING METHOD AND SYSTEM IN THE LEARNING SYSTEM

[75] Inventor: Masahiro Abe, Sayama, Japan

[73] Assignee: Hitachi, Ltd., Tokyo, Japan

[21] Appl. No.: 469,241

[22] Filed: Jan. 24, 1990

[30] Foreign Application Priority Data

Jan. 25, 1989 [JP] Japan .................................. 1-13904

[51] Int. Cl.$^5$ ...................... G06F 15/18; G06F 15/46
[52] U.S. Cl. ...................................... 395/62; 395/60;
364/DIG. 1
[58] Field of Search ............... 364/513, 200, 422, 521;
395/60, 62

[56] References Cited

U.S. PATENT DOCUMENTS

| 4,176,052 | 11/1979 | Bruce et al. | 364/165 |
| 4,866,634 | 9/1989 | Rebon et al. | 364/513 |
| 4,905,163 | 2/1990 | Garber et al. | 364/200 |
| 4,939,648 | 7/1990 | O'Neil et al. | 364/422 |
| 4,991,118 | 2/1991 | Akiyama et al. | 364/514 |
| 5,019,961 | 5/1991 | Addesso et al. | 364/521 |

OTHER PUBLICATIONS

"The Handbook of Artificial Intelligence" pp. 406–410.

Primary Examiner—Allen R. MacDonald
Assistant Examiner—George Davis
Attorney, Agent, or Firm—Antonelli, Terry, Stout & Kraus

[57] ABSTRACT

Method and system of predicting attribute value in the learning system, (a) where expected value of equivalent example and its classification class is generated by domain knowledge, with respect to the test example being supplemented with candidates of a plural number of attribute values, in which the attribute lacking part of attribute values can adopt in the learning system, having (i) attribute descriptions containing a plural number of training examples, each of which contains attribute and its attribute value, and such training example and classification class adopted by each training example, and (ii) domain knowledge generating a pair of second example and its classification class from a pair of first example and its classification class, as equivalent example, (b) where classification class of equivalent example generated as above is predicted by decision tree produced based on the above attribute descriptions, and (c) where the attribute value lacking the above test example is predicted by use of the expected value of classification class and the above prediction result with respect to the above equivalent example.

6 Claims, 12 Drawing Sheets

FIG. 6

4 INPUT EXAMPLE

INPUT EXAMPLE 43

| 41 ATTRIBUTE NAMES | 42 ATTRIBUTE VALUES |
|---|---|
| ATTRIBUTE NAME 1 (MESH 1) | ATTRIBUTE VALUE 1 (TILE NUMBER(BLANK)) |
| ATTRIBUTE NAME 2 (MESH 2) | ATTRIBUTE VALUE 2 (TILE NUMBER(2)) |
| ATTRIBUTE NAME 3 (MESH 3) | ATTRIBUTE VALUE 3 (TILE NUMBER(3)) |
| ATTRIBUTE NAME 4 (MESH 4) | ATTRIBUTE VALUE 4 (TILE NUMBER(1)) |
| ATTRIBUTE NAME 5 (MESH 5) | ATTRIBUTE VALUE 5 (TILE NUMBER(5)) |
| ATTRIBUTE NAME 6 (MESH 6) | ATTRIBUTE VALUE 6 (TILE NUMBER(6)) |
| ATTRIBUTE NAME 7 (MESH 7) | ATTRIBUTE VALUE 7 (TILE NUMBER(4)) |
| ATTRIBUTE NAME 8 (MESH 8) | ATTRIBUTE VALUE 8 (TILE NUMBER(7)) |
| ATTRIBUTE NAME 9 (MESH 9) | ATTRIBUTE VALUE 9 (TILE NUMBER(8)) |
| ATTRIBUTE NAME 10 (OPERATION) | ATTRIBUTE VALUE 10 (CONTENT OF OPERATION(?)) |

FIG. 7

5 TEST EXAMPLES

ATTRIBUTE DESCRIPTIONS 51

| ATTRIBUTE NAMES 511 | ATTRIBUTE VALUES 512 |
|---|---|
| ATTRIBUTE NAME 1 (MESH 1) | ATTRIBUTE VALUE 1 (TILE NUMBER(BLANK)) |
| ATTRIBUTE NAME 2 (MESH 2) | ATTRIBUTE VALUE 2 (TILE NUMBER(2)) |
| ATTRIBUTE NAME 3 (MESH 3) | ATTRIBUTE VALUE 3 (TILE NUMBER(3)) |
| . . . | . . . |
| ATTRIBUTE NAME 9 (MESH 9) | ATTRIBUTE VALUE 9 (TILE NUMBER(8)) |
| ATTRIBUTE NAME 10 (OPERATION) | ATTRIBUTE VALUE 10 (CONTENT OF OPERATION(→)) |
| ATTRIBUTE NAME 1 (MESH 1) | ATTRIBUTE VALUE 1 (TILE NUMBER(BLANK)) |
| ATTRIBUTE NAME 2 (MESH 2) | ATTRIBUTE VALUE 2 (TILE NUMBER(2)) |
| ATTRIBUTE NAME 3 (MESH 3) | ATTRIBUTE VALUE 3 (TILE NUMBER(3)) |
| . . . | . . . |
| ATTRIBUTE NAME 9 (MESH 9) | ATTRIBUTE VALUE 9 (TILE NUMBER(8)) |
| ATTRIBUTE NAME 10 (OPERATION) | ATTRIBUTE VALUE 10 (CONTENT OF OPERATION(↓)) |

52 FIRST TEST EXAMPLE

53 SECOND TEST EXAMPLE

FIG. 8

6 DOMAIN KNOWLEDGE

RULE 1    IF CONDITION 1 (EXAMPLE X, CLASSIFICATION CLASS Y)
          THEN GENERATE 1 (EXAMPLE m, CLASSIFICATION CLASS n)

RULE 2    IF CONDITION 2 (EXAMPLE X, CLASSIFICATION CLASS Y)
          THEN GENERATE 2 (EXAMPLE m, CLASSIFICATION CLASS n)
                    .
                    .
                    .

RULE j    IF CONDITION j (EXAMPLE X, CLASSIFICATION CLASS Y)
          THEN GENERATE 3 (EXAMPLE m, CLASSIFICATION CLASS n)

FIG. 9

6 SPECIFIC EXAMPLE OF DOMAIN KNOWLEDGE

| | CONDITION | GENERATION |
|---|---|---|
| RULE 1 | 611: EXAMPLE X = [→, P1, P2 / P3, P4, P5 / P6, P7, P8]  612: CLASSIFICATION CLASS Y = P | 621: EXAMPLE m = [↓, P1, P2 / P3, P4, P5 / P6, P7, P8]  622: CLASSIFICATION CLASS n = N |
| RULE 2 | 613: EXAMPLE X = [→, P1, P2 / P3, P4, P5 / P6, P7, P8]  614: CLASSIFICATION CLASS Y = P | 623: EXAMPLE m = [P1, ←, P2 / P3, P4, P5 / P6, P7, P8]  624: CLASSIFICATION CLASS n = N |

FIG. 10

7 EQUIVALENT EXAMPLE TABLE
ATTRIBUTE DESCRIPTIONS —71

| ATTRIBUTE NAMES —711 | ATTRIBUTE VALUES —712 |
|---|---|
| ATTRIBUTE NAME 1 (MESH 1) | ATTRIBUTE VALUE 1 (TILE NUMBER(BLANK)) |
| ATTRIBUTE NAME 2 (MESH 2) | ATTRIBUTE VALUE 2 (TILE NUMBER(2)) |
| ATTRIBUTE NAME 3 (MESH 3) | ATTRIBUTE VALUE 3 (TILE NUMBER(3)) |
| ... | ... |
| ATTRIBUTE NAME 9 (MESH 9) | ATTRIBUTE VALUE 9 (TILE NUMBER(8)) |
| ATTRIBUTE NAME 10 (OPERATION) | ATTRIBUTE VALUE 10 (CONTENT OF OPERATION(↓)) |
| CLASS VALUE(N) | |
| ATTRIBUTE NAME 1 (MESH 1) | ATTRIBUTE VALUE 1 (TILE NUMBER(2)) |
| ATTRIBUTE NAME 2 (MESH 2) | ATTRIBUTE VALUE 2 (TILE NUMBER(BLANK)) |
| ATTRIBUTE NAME 3 (MESH 3) | ATTRIBUTE VALUE 3 (TILE NUMBER(3)) |
| ... | ... |
| ATTRIBUTE NAME 9 (MESH 9) | ATTRIBUTE VALUE 9 (TILE NUMBER(8)) |
| ATTRIBUTE NAME 10 (OPERATION) | ATTRIBUTE VALUE 10 (CONTENT OF OPERATION(←)) |
| CLASS VALUE(N) | |

EQUIVALENT EXAMPLE EX 1 — 73
CLASSIFICATION CLASS — 75
EQUIVALENT EXAMPLE EX 2 — 74
CLASSIFICATION CLASS — 76

FIG. 11

8 HYPOTHESIS TABLE

| | TEST EXAMPLES | | EQUIVALENT EXAMPLES | | |
|---|---|---|---|---|---|
| | 811 | 812 | 821 | 822 | 823 | 824 |
| HYPOTH-ESIS | ATTRIBUTE VALUE 10 | CLASSIFICA-TION CLASS | EXAMPLE NAME | EXPECTED VALUE OF CLASSIFICA-TION CLASS | PREDICTED RESULT OF CLASSIFICA-TION CLASS | COINCIDENCE FLAG |
| 85 | ↑ | P | EX 1 | N | P | 0 |
| | | | EX 2 | N | P | 0 |
| 83 | | | EX 3 | N | P | 0 |
| 86 | | N | EX 4 | P | N | 0 |
| | | | EX 5 | P | P | 1 |
| | | | EX 6 | P | N | 0 |
| 87 | → | P | EX 7 | N | N | 1 |
| | | | EX 8 | N | N | 1 |
| 84 | | | EX 9 | N | P | 0 |
| 88 | | N | EX 10 | P | N | 0 |
| | | | EX 11 | P | N | 0 |
| | | | EX 12 | P | P | 1 |

Column labels (top): 831, 832, 833, 834, 835, 836, 841, 842, 843, 844, 845, 846

ATTRIBUTE VALUE PREDICTING METHOD AND SYSTEM IN THE LEARNING SYSTEM

BACKGROUND OF THE INVENTION

1. Field of the Invention

This invention relates to the method and system of predicting attribute value of unknown examples, for instance, optimum operation, etc. in the system control field and cause of fault, etc. in the knowledge processing field, by learning given examples in the field of system control, pattern recognition or knowledge processing.

2. Description of the Prior Art

A learning system is a system, where, from a plural number of examples concerning a given object system (hereinafter called the training examples), properties special to such training examples are extracted experimentally and such properties are utilized in solving the problem in an unknown example (hereinafter called the input example). For instance, in the field of system control, it is possible to collect the optimum operation in various conditions of a system as the training examples, to extract the relation between the system conditions and optimum operation, and to use such relation in solving the problem of predicting the optimum operation in unknown, specific conditions.

Further, in the field of knowledge processing, it is possible to collect symptoms and causes of the fault in the fault diagnosis system as training examples, to extract the relation between symptoms and causes, and to use such relation in solving the problem of predicting the cause in unknown, specific symptoms. In the learning system, the special relation among training examples, which is extracted from training examples and used in prediction for solving the problem of an input example will be called the decision tree. Production of a decision tree from training examples is called the learning. Therefore, the learning system can be said to be a system which learns the decision tree from training examples and uses such decision tree for solving the problem of an input example.

Heretofore, as technology for learning the decision tree from training examples there is technology called ID3. This is discussed, for instance, in the Handbook of Artificial Intelligence, Volume 3, Pitman Books Ltd. (1982), pp. 406 to 410 (hereinafter called Reference 1).

A conventional learning system using ID3 is explained by use of FIG. 3. FIG. 3 shows the learning and predicting method in the learning system, where ID3 is used.

To begin with, data used in this learning system are explained.

Training example table 2 consists of one or more of training examples 22~23 and classification classes 24~25, given correspondingly to each training example, as sown in FIG. 4. Training examples 22~23 are expressed in attribute descriptions 21. Each attribute description in attribute descriptions 21 consists of attribute name 211 and attribute value 212. Attribute name 211 refers to a system component element in the system control field, for instance, and indicates a name which changes variously with transition of time, for example, control valve, pressure gauge, etc.

Further, attribute value refers to the value adopted by the component element having such attribute name, and expresses the type of operation, whether opening or closing, with respect to the control valve, and the indicated value with respect to the pressure gauge. Therefore, attribute descriptions 21 can express conditions (pressure, etc.) or operation at that time (opening/closing of control valve, etc.) for the object system.

Classification classes 24~25 which exist corresponding to each training example in the training example table 2 refers to the classified names, when such training example is classified names when such training example is classified under certain standards. Further, the value adopted by classification class is called the class value. For instance, class value (P) is used in the case where such training example belongs to the class which shows a correct example, and class value (N) in the case where such training example belongs to the class which shows a wrong example.

Decision tree 3 is the data expressing the relation between the attribute descriptions 21, which describes training example in training Example table 2, and the class value of such training example. As shown in FIG. 5, it is expressed as a tree, having attribute names as nodes and branches which branch off corresponding to attribute values and finally arrive at the leaves corresponding to class values. Decision tree 3 expresses the class value of the training example, which is expressed by attribute descriptions 21.

Each test example 52~53 in test examples 5 (FIG. 7) has a data structure equal to training example 22~23 in test example table 2. However, classification classes are not given to test examples in advance. Test examples 5 is collection of examples, for which prediction of class value is desired. For instance, in the case of system control field mentioned previously, in order to predict whether the control valve is to be opened or closed, when the pressure gauge is at a certain value, a plural number of test examples, each of which contain the pressure gauge value and "close" is attribute values, and a plural number of test examples, each of which contain the pressure gauge value and "open" as attribute values, are prepared, and class value (P or N) of such test examples should be predicted. It can be predicted that such test examples are correct, if P, and are wrong, if N. Therefore, it is possible to obtain attribute value, for which prediction is desired, from the test examples which give class value P.

Next, the learning method and predicting method in ID3 will be explained according to FIG. 3.

In step 11, decision tree 3 is generated from attribute descriptions 22~23 and classification classes 24~25 of each training example by use of the training example table 2 (Step 11).

Method of generating this decision tree is minutely explained in Reference 1.

Decision tree 3 generated is used in predicting classification classes of each test example 52~53 in test examples 5A. In step 14A, classification classes of each test example 52~53 in test examples 5A, which had been prepared by supplementing unknown attribute value with candidates decided by the object system, are sequentially predicted by use of the decision tree 3, and correct test example is predicted from the class value (P) of the test example, and then unknown attribute to be obtained is predicted therefrom.

In the above conventional technology, the relation between the attribute descriptions 21 and the classification classes 24~25 was obtained from a limited number of training examples 22~23, and it was applied by assuming that such relation also held good in the generally unknown test examples 52~53. Therefore, the number of exceptions increased with increase in complexity of such relation, and the number of wrong predictions increased, thereby causing a problem of not being able to obtain unknown attribute value correctly.

Additionally, in the above conventional technology, there existed a problem of having no means of knowing the degree of certainty in prediction of unknown attribute value at the time of such prediction.

SUMMARY OF THE INVENTION

The first object of this invention is to increase probability of obtaining correct prediction (hereinafter called the precision of prediction) with respect to unknown test examples, thereby increasing the precision of prediction with respect to unknown attribute values.

The second object of this invention is to permit knowing the degree of certainty in prediction of unknown attribute value at the time of such prediction.

The above first object can be accomplished i) by generating the test examples, where a lacked attribute value has been supplemented with candidates from input example, which has partly lacked attribute value, (ii) by producing combination of the equivalent examples and the expected value of such classification classes, from the combination of the above test examples and classification classes thereof, by the domain knowledge which produces the combination of No. 2 examples and classification classes thereof as the equivalent example from the combination of No. 1 examples and classification classes thereof, (iii) by predicting classification classes of the equivalent examples produced as above based on a plural number of training examples, each containing at least one attribute and description of attribute value of such attribute and the attribute descriptions, each containing such training example and classification classes of such training example, and (iv) by predicting lacked attribute value of the above test example by the use of the expected value of classification classes with respect to the above equivalent example and the above prediction results.

The above second object can be accomplished by determining the degree of certainty on the lacked attribute value, which had been predicted by the use of expected value and prediction results of classification classes with respect to each equivalent example in the No. 2 means for solving the above problem. Summary of the above actions in this invention will be explained below.

To start with, the data structure which appears newly as means of solving the given task will be explained.

Input example refers to the example, where part of attribute values are not given, that is to say, which has unknown attribute values, as shown by the example in FIG. 6. In the example in FIG. 6, attribute value 10 is an unknown attribute value. As described previously, the object of this learning system is to obtain unknown attribute values.

Domain knowledge refers to the rules of expressing the relation among classification classes between specific examples, and it can be realized as a set of rules which produce combination of another example having specific relation with such classes and classification classes which this example should have, by applying specific operation to the given example and also to the example given from classification classes ancillary thereto.

In the concrete, domain knowledge can be expressed as a set of rules, which consist of the conditional section and the generating section, which is executed when satisfying such condition, as shown in FIG. 8. Each rule generates separate example and classification class, when given example and classification class of such example satisfy the condition of such rule, by the use of such example and such classification class. Examples produced in this manner is called the equivalent example here. Domain knowledge is constructed of a plural number of rules, and by the use of domain knowledge, it is possible to generate a plural number of equivalent examples and classification classes.

Such domain knowledge is unique to the object system, and can be obtained by search through trial and error, based on analysis of the object system in general. For instance, when the object system is an eight puzzle, the concrete example of domain knowledge becomes like a figure shown in FIG. 9. Here, the eight puzzle is a game, where the tiles bearing a number from 1 to 8, are placed on a board having 3 blocks each in vertical and horizontal directions and the tiles are finally positioned in a predetermined layout, while moving the tiles by using the blank blocks, without being pressed out of the board.

In FIG. 9, attention is called to the blank block without any tile on the board. The operation for the next move is shown with an arrow mark in layout diagrams 611, 613, 621 and 623, with an expression of example X and example m. For instance, under condition 1 of rule 1 in 63, in example X of layout diagram 611, pi (i=1 through 8) which represents the tile can be different, arbitrary 8 tiles. However, it expresses that operation of the blank block has to agree with the direction shown by the arrow mark. It also expresses that classification class of example X in layout diagram 611 has to be P612. It expresses that equivalent example m generated, when condition 1 of rule 1 in 63 holds good, has to have each tile (Pi), appearing in condition 1, being arranged as shown in layout diagram 621 and operation at that time has to be in downward direction as shown by the arrow mark, and also that classification class of equivalent example generated is N622. Therefore, when the meaning of rule 1 in 63 is expressed with words, when certain operation on certain board is correct, different operation on the same board will be wrong.

Equivalent example table 7 refers to equivalent examples 73~74 generated from test example, by the use of domain knowledge, and classification class thereof, and to classification classes 75~76. Equivalent example table 7 can be expressed in data structure as shown in FIG. 10.

Next, the reasons why the first object of the present invention can be accomplished will be explained.

The principles of improving the precision of prediction used in this invention are based on statistical processing. That is to say, when precision of prediction with respect to one phenomenon (probability) is p $(0.5<p<1)$, if a plural number of phenomena equivalent to such phenomenon can be obtained, it is possible to predict the original phenomenon with higher precision, by statistically processing the prediction results of such phenomena. For instance, when n units of equivalent phenomena are used, since $n \times p$ units among them can be said to be correct in average, if p is larger than 0.5, it is possible to predict the original phenomenon with higher precision in adopting decision by majority on the prediction result of n units of equivalent phenomena.

The method of accomplishing the first object of this invention will be described concretely in using the above principles.

Firstly, in step 12, test examples supplemented with candidates of the value, which can be determined by the object system with respect to unknown attribute value, are produced from input example. [For instance, 52 and 53 in test examples 5 (FIG. 7) with respect to input example 4 (FIG. 6)] If it is possible to judge the correct test example in the test examples, the unknown attribute value can be obtained. The matter of identifying the correct test example can be predicted from classification class of the test example. That is to say, from definition it can be predicted that the test example having class value P is correct, and the test example having class value N is wrong. In the past, class value of each test example was predicted by simply using decision tree 3, and the test example having class value P was merely selected. However, in this invention, prediction of classification class of each test example is determined statistically by replacing with prediction of classification class of examples which are equivalent to each test example. According to the above principles, when precision of prediction in decision tree 3 is larger than 0.5, it should be possible to predict with higher precision by this method. That is two hypotheses, which assume class value P and class value N with respect to each test example, are produced at first, and with respect to each hypothesis the expected values of equivalent examples and classification class ancillary thereto are produced by the use of domain knowledge. (For instance, with respect to test example 52 in FIG. 7, when rule 1 of 63 and rule 2 of 64 of domain knowledge in FIG. 9 are applied to the hypothesis, which assumes class value P, equivalent example EX1 of 73 and equivalent example EX2 of 74 in FIG. 10 are generated respectively.)

When each equivalent example is generated, expected value of classification class is determined. (For instance, in the case of equivalent EX1 of 73 and equivalent example EX2 of 74, both are N.)

That is to say, the problem of whether each test example takes the class value shown in each hypothesis or not is replaced with the problem of whether the class value, which is the same as the expected value of classification class determined, when equivalent examples produced from such hypothesis were generated, can be obtained from such equivalent example by the use of decision tree 3 or not.

Next, in step 14 shown in FIG. 13, the prediction result of classification class is obtained from each equivalent example by the use of decision tree 3, and is compared with the expected value of classification class of each equivalent example in step 15. (For instance, in FIG. 11, coincidence flag 824 indicates whether expected value of classification class 822 and predicted result of classification class 823 coincide or not.)

Among hypotheses with respect to each test example, the hypothesis having the largest number of equivalent examples, where expected value of classification class and predicted result of classification class coincide, can be predicted to be the classification class of test example. By selecting test example which has been predicted to have class value P from the result of the above processing, correct test example can be obtained, by which such unknown attribute value can be predicted. (For instance, in FIG. 11, test example enclosed by bold lines is selected, unknown attribute value, namely attribute value 10, is predicted to be the operation indicated by the downward arrow mark.)

By the foregoing processing the first object of this invention can be accomplished.

Next, the reasons why the second object of this invention can be accomplished are explained.

In step 15 shown in FIG. 14, when class value of each test example is predicted from prediction results of equivalent examples, certainty of such test example prediction is obtained, for instance, from the ratio between the number of examples which produced the same prediction results among equivalent examples and the total number of equivalent examples among equivalent examples. The second object can be accomplished by indicating this certainty.

The foregoing and other objects, advantages, manner of operation and novel features of the present invention will be understood from the following detailed description when read in connection with the accompanying drawings.

BRIEF DESCRIPTION OF THE DRAWINGS

FIG. 6 is a diagram showing data structure of input example used in the method shown in FIG. 1.

FIG. 7 is a diagram showing data structure of test examples used in the method shown in FIG. 1.

FIG. 8 is a diagram showing data structure of domain knowledge used in the method shown in FIG. 1.

FIG. 9 is a diagram showing a specific example of domain knowledge in FIG. 8.

FIG. 10 is a diagram showing data structure of equivalent example table used in the method shown in FIG. 1.

FIG. 11 is a diagram showing data structure of hypothesis table used in the method shown in FIG. 1.

PREFERRED DESCRIPTION OF THE EMBODIMENTS

Embodiments of the present invention will be explained hereinafter. First of all, embodiments concerning method of predicting the optimum operation of eight puzzle under the present invention are explained by the use of FIG. 1, FIG. 2 and FIGS. 4 through 14. Further, the reasons for taking up a field of game, called eight puzzle, are that this field is basically the same as the system control field, in object system conditions and from the point that optimum operation at such condition is handled, and that the effects of invention can easily shown. However, it is also possible to apply the present invention to games, etc.

Figure 2:
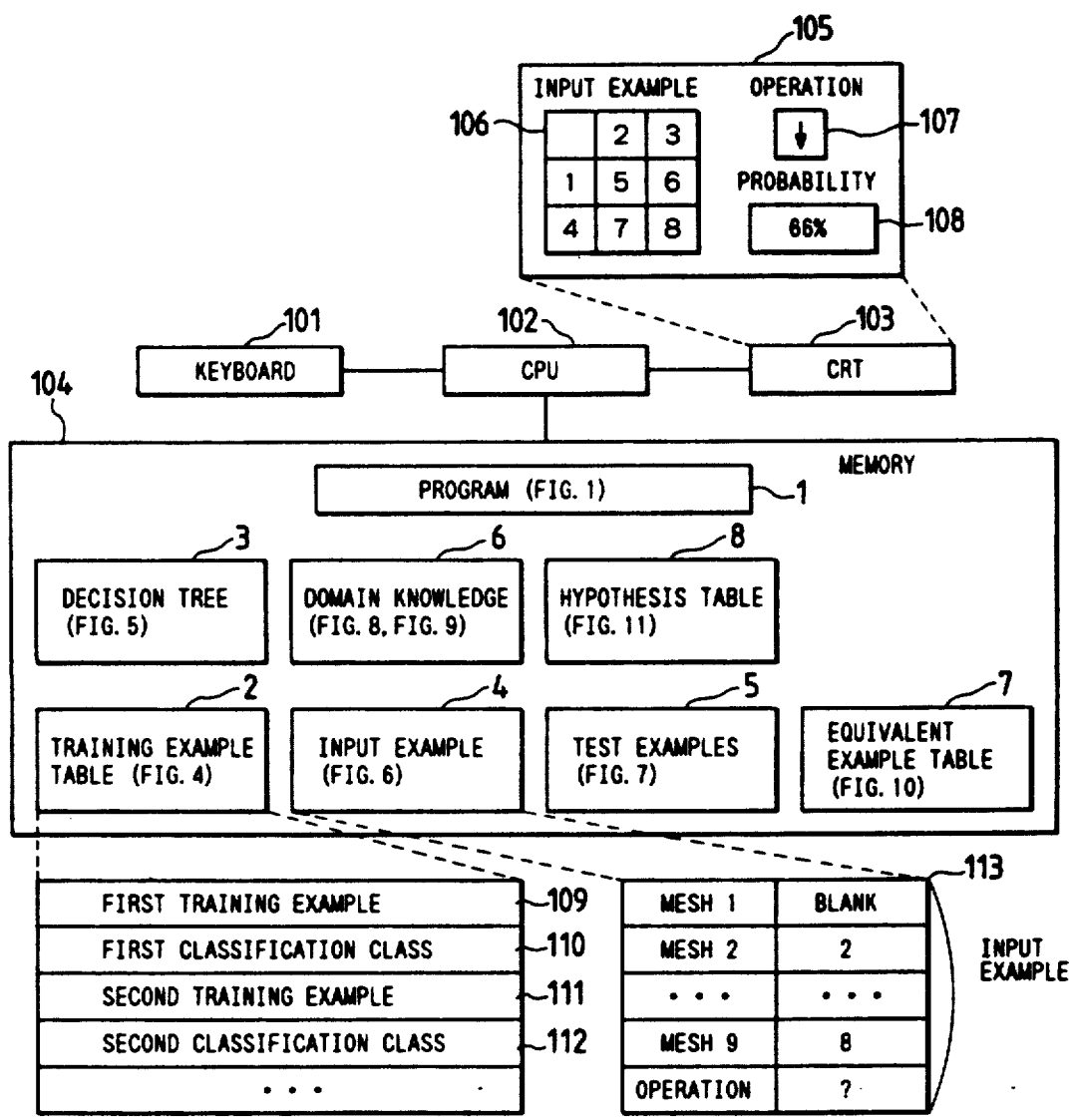
FIG. 2 is a diagram showing the entire construction of the first embodiment.

FIG. 2 is a diagram showing the entire construction of the first embodiment under the present invention, and it can be realized on a computer, which contains CPU102, input device (keyboard 101), output device (CRT103) and memory 104. 1 is the program for predicting optimum operation on arbitrary eight puzzle board, 2 the training example table concerning the board and optimum operation, 3 the decision tree produced from training example table 2, 4 the input example expressing the board, 5 the test examples produced from input example 4, 6 the domain knowledge which produces equivalent example table 7 from test example, 7 the produced equivalent example table, and 8 the hypothesis table which holds data for the entire processing.

Figures 3, 4:
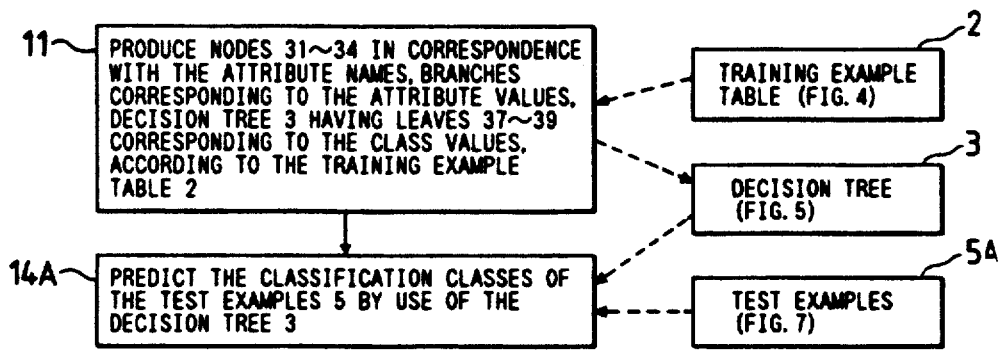
FIG. 3 is a diagram showing the processing of the conventional learning system.
FIG. 4 is a diagram showing data structure of training example table used in the method shown in FIG. 1.

FIG. 4 is a diagram showing details of training example 2, consisted of a plural number of training example 22~23 and classification class 24~25 corresponding to each training example 22~23. Each training example is expressed by attribute descriptions 21, which is a set of attribute description represented by a pair of attribute name 211 and attribute value 212. In this embodiment, attribute names 1 through 9 express blocks 1 through 9 on the eight puzzle board, and attribute name 10 the optimum operation at that time. They are the numbers assigned to each of the tiles which enter the blocks of attribute values 1 through 9, corresponding to attribute names 1 through 9, and attribute value 10 expresses the nature of operation, for instance, → (Move blank to next block at right), ← (Move blank to next block at left), β (Move blank to next block on top), and ↓ (Move blank to next block on bottom). No. 1 training example 22 in FIG. 4 shows such and similar matters that tile number 5 is in block 1 and tile number 2 in block 2, and class value P in the first classification class 24 expresses that the first training example is the correct example.

Figure 5:
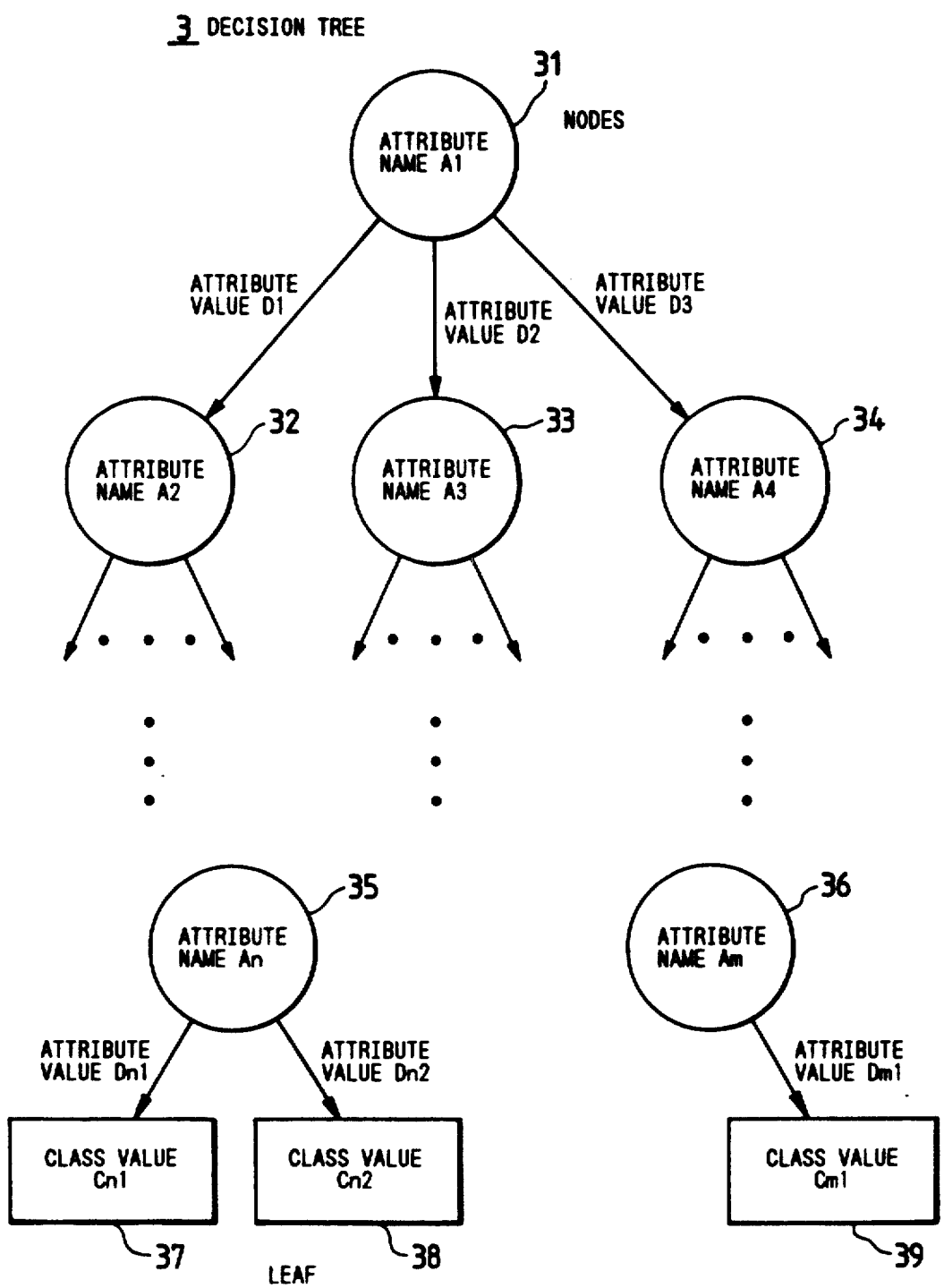
FIG. 5 is a diagram showing structure of decision tree used in the method shown in FIG. 1.
Figure 12:
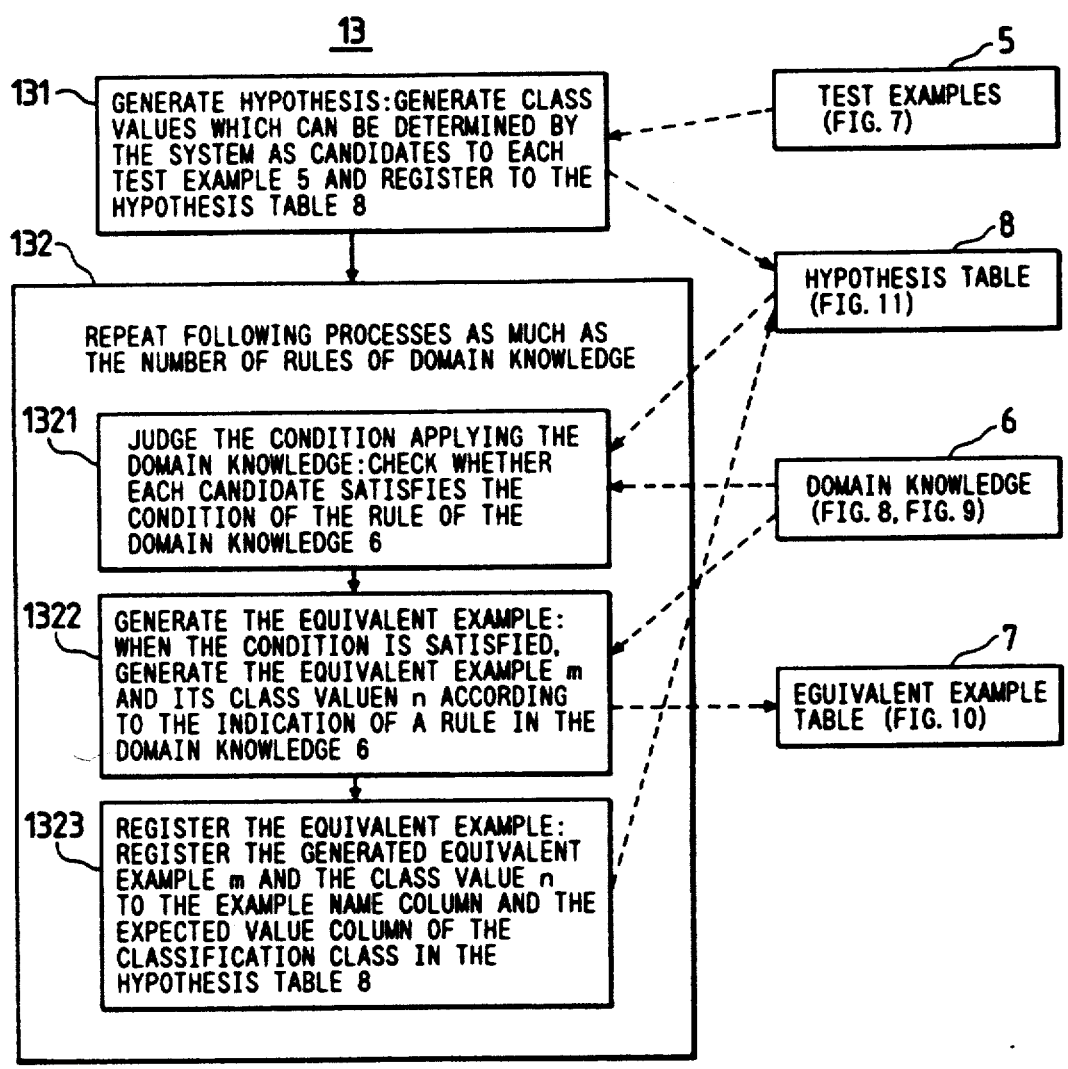
FIG. 12 is a diagram showing details of processing step 13 shown in FIG. 1.

FIG. 5 is a diagram showing details of decision tree 3. Attribute name A1 is made node 31, from which branching off takes place corresponding to attribute value D1, attribute value D2, attribute value D3 of such attribute name A1. Branching destination of attribute value D1 is attribute name A2, constituting node 32. Branching off is repeated, corresponding to attribute value of attribute name A2. Finally, attribute value Dn1 of node 35 for attribute name An will have class value Cn1, and attribute value Dn2 will have class value Cn2, having leaf 37 and leaf 37 respectively. That is to say, classification class possessed by the example in attribute descriptions, which is expressed as a pair of attribute name and attribute value adopted until reaching the leaf, is described in such leaf.

FIG. 6 is a diagram showing details of input example 4, where data which designates the board, for which the optimum operation is desired, are stored. In input example 4, a condition where blank, 2, 3, 1, 5, 6, 4, 7, 8 are respectively placed in blocks 1 through 9 is expressed. Further, no value is entered into attribute value 10, thereby indicating that the object is to obtain this value.

FIG. 7 is a diagram showing details of test examples 5, which consists of a plural number of test examples 52~53. Each test example is expressed by attribute descriptions 51, which is a set of attribute description expressed by a pair of attribute name 511 and attribute value 512. In this embodiment, attribute names 1 through 9 represent blocks 1 through 9 on the eight puzzle board, and attribute name 10 expresses the optimum operation at that time. Attribute values 1 through 9 corresponding to attribute names 1 through 9 are the same as the attribute values in input example 4, and one candidate of operation which can be determined by this system is entered into attribute value 10. In the case of FIG. 7, in attribute value 10 of the first test example 52 there is entered →(Move blank to next block at right), and in attribute value 10 of the second test example 53 there is entered (Move blank to next block on bottom).

FIG. 8 expresses details of domain knowledge 6. Domain knowledge 6 consists of a plural number of rules. Each rule j expresses that equivalent example m and classification class n are generated, when given example X and classification class of such example satisfy condition j of such rule j.

FIG. 9 expresses specific example of domain knowledge in the eight puzzle. Rule 1 expresses that, when certain operation is correct on certain board, an operation other than the above on the same board is wrong. Rule 2 expresses that, when certain operation is correct on certain board, an operation just opposite to such operation on the board after executing such operation, for instance, ← operation with respect to operation, is wrong.

FIG. 10 is a diagram showing details of equivalent example table 7, which consists of a plural number of equivalent examples and classification class corresponding to each thereof. Each equivalent example is expressed by attribute descriptions 71, which is a set of attribute descriptions, made up of attribute name 711 and attribute value 712. Attribute names 1 through 10 are the same as those in test example 5. Attribute values 1 through 10 have attribute values produced from test example by the use of domain knowledge. Similarly, classification classes of equivalent example 7 have class values produced from test example by the use of domain knowledge. The first equivalent example in FIG. 10 was produced from the first test example in FIG. 7 by the use of rule 1 in FIG. 9. Similarly, the first classification class 75 was produced by the use of rule 1 in FIG. 9.

FIG. 11 shows details of hypothesis table 8. Hypothesis table 8 is used for control of the produced equivalent examples 7, and stores (i) the type of test example constituting equivalent example and the type of classification class produced by the rule of domain knowledge 6, as expected value of classification class 822, and (ii) prediction of classification class obtained by applying this equivalent example to decision tree 3, as predicted result of classification class 823, and, further, (iii) the matter of agreement between expected value of classification class and predicted result of classification class, as coincidence flag 824.

Next, actions of this embodiment will be explained by using FIG. 1, FIG. 12, FIG. 13 and FIG. 14.

Figure 1:
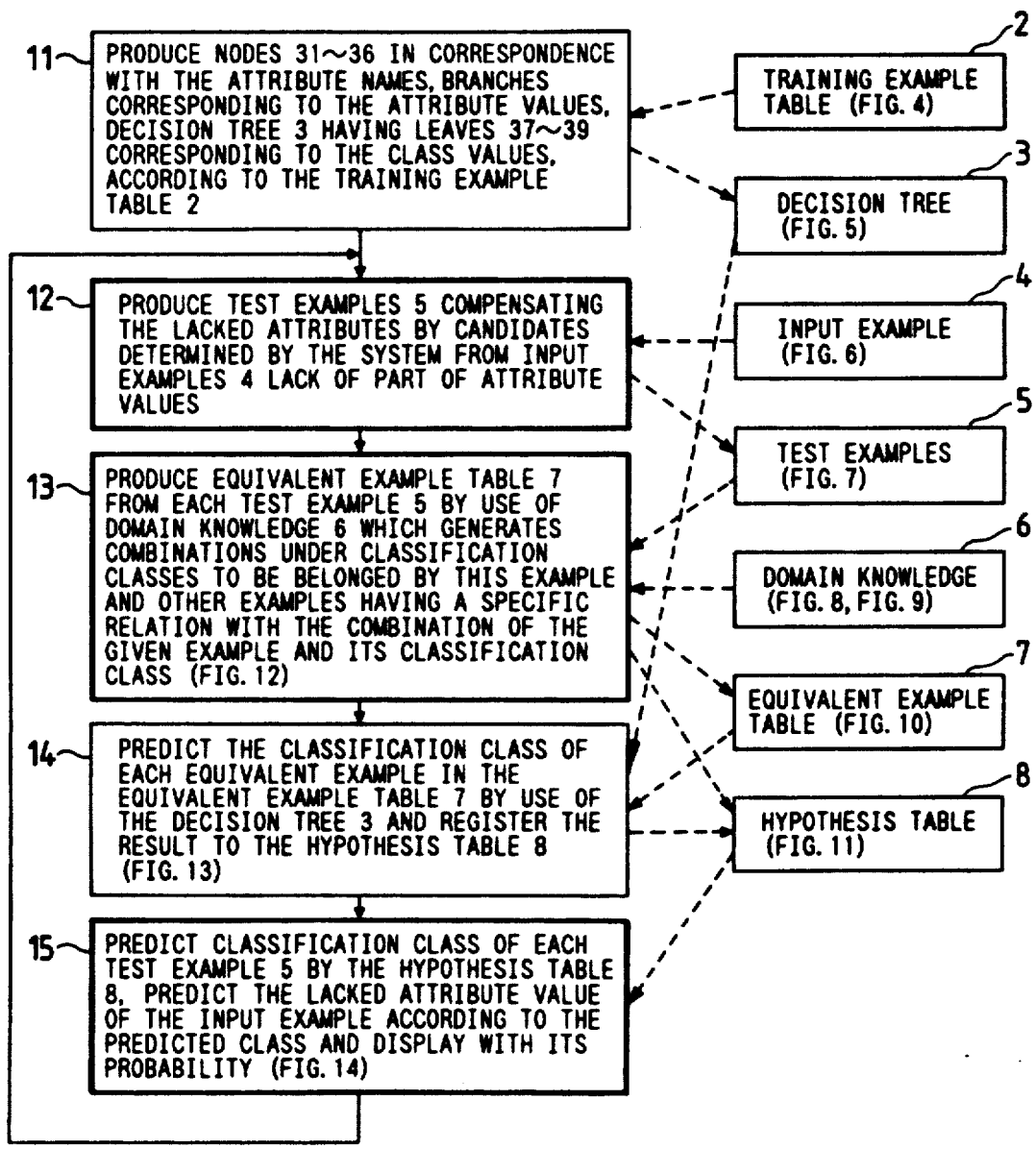
FIG. 1 is a diagram showing the entirety of the processing in the first embodiment of attribute value prediction method under the present invention.

FIG. 1 is a diagram showing the entire actions of this embodiment, where step 12, step 13 and step 15 are characteristics of the present invention.

In step 11, decision tree 3 is generated by having training example table 2 as input. The method used in this processing is described in detail in Reference 1.

In step 12, test examples 5 are generated by adding attribute value candidates, which can be determined by the system, to the unknown attribute value, which is in training example table 2 and for which attribute value is not yet given in input example 4, from input example 4. In the case of input example 4 in FIG. 6, two operations, namely → (Move blank to next block at right) and ↓ (Move blank to next block on bottom), are possible with respect to unknown attribute value 10, as shown in FIG. 7, and the first test example 52 and the second test example 53, which respectively contains each of the above operations as attribute value 10, are generated.

In step 13, equivalent example table 7 is generated from test examples 5 by use of domain knowledge 6, and it is registered into hypothesis table 8. Details of this processing step will be explained by using FIG. 12.

In step 131, class value which can be determined by the system is generated as candidate to each test example 5, and it is registered into hypothesis table 8. In the example shown in FIG. 11, two classification classes, namely P and N, are possible.

In step 132, repetitions of step 1321, step 1322 and step 1323 are made as much as the number of rules of domain knowledge.

In step 1321, a check is made whether each candidate satisfies the condition of the rule of the domain knowledge 6.

In step 1322, when the condition is satisfied equivalent example m and its class value n are generated, according to the indication of a rule in the domain knowledge 6.

In step 1323, the generated equivalent example m and the class value n are respectively registered into the example name column and the expected value column of the classification class in the hypothesis table 8.

As a result of the processing described above, equivalent examples EX1 through EX12 are registered into the hypothesis table 8, together with the expected value of the classification class.

Figure 13:
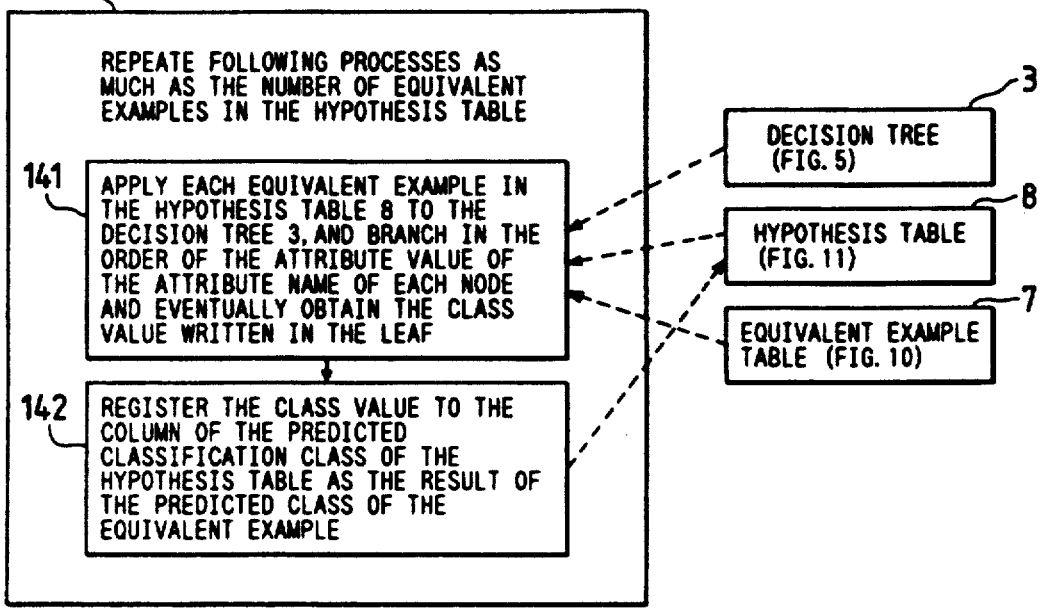
FIG. 13 is a diagram showing details of processing step 14 shown in FIG. 1.
Figure 14:
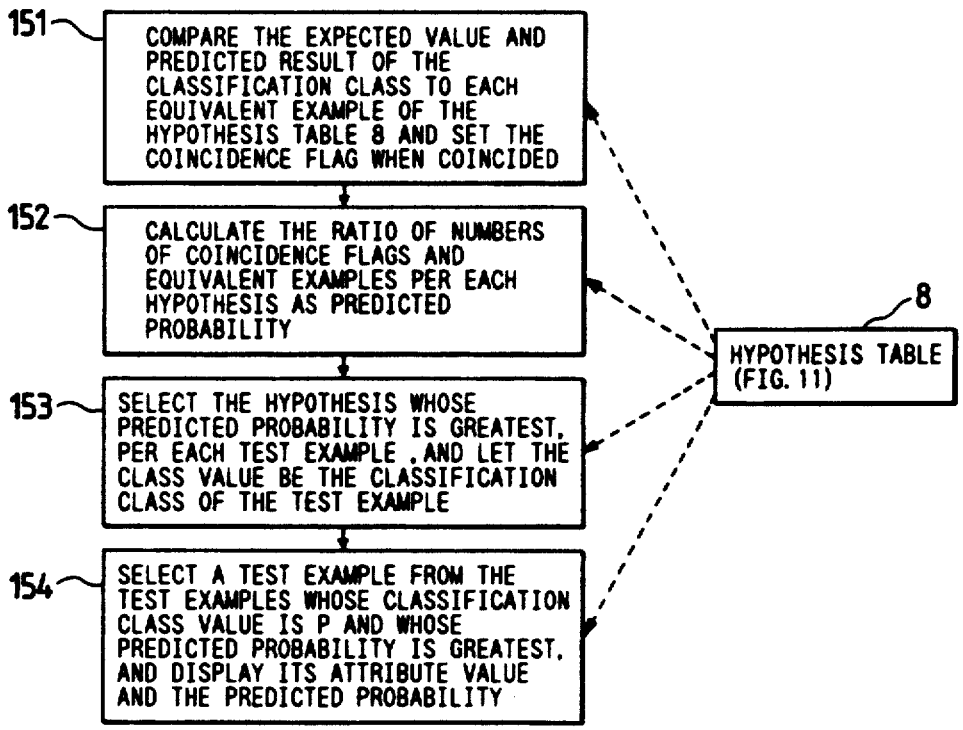
FIG. 14 is a diagram showing det of processing step 15 shown in FIG. 1.

In step 14, classification class of each equivalent example 7 is predicted by use of decision tree 3. Details of the processing of step 14 is shown in FIG. 13.

In step 14, repetitions of step 141 and step 142 are made as much as the number of equivalent examples in the hypothesis table 8.

In step 141, each equivalent example in the hypothesis table 8 is applied to the decision tree 3, branching-off is made in the order of the attribute value of the attribute name of each node and eventually the class value written in the leaf is obtained.

In step 142, the class value obtained in the above step 141 is registered into the column 823 of the predicted classification class of the hypothesis table as the result of the predicted class of the equivalent example.

As a result of the above processing in step 14, predicted result of classification class 823 is stored into the hypothesis table 8 in FIG. 11, as diagramatically shown.

In step 15, classification class of each test example 5 is predicted by use of the hypothesis table 8, and test example is selected from the result thereof, and predicted result and probability of unknown attribute value are displayed.

In step 151, the expected value of classification class 822 and the predicted result of classification class 823 are compared with respect to each equivalent example of the hypothesis table 8, and the coincidence flag 824 is set when they coincide.

In step 152, the ratio of numbers of coincidence flags 824 and equivalent examples per each hypothesis 85~88 as predicted probability.

In step 153, the hypothesis whose predicted probability is greatest, for each test example, is selected, and the class value of such hypothesis is made the classification class of such test example.

In step 154, a test example from the test examples whose classification class value is P and whose predicted probability is greatest is selected, and its attribute value and the predicted probability is displayed.

As a result of the above processing in step 15, the coincidence flag 824 is set into the hypothesis table 8 in FIG. 11, as diagramatically shown, and the test example 84 encircled by a bold frame is selected, and such result appears as displayed image of CRT shown in FIG. 2. That is to say, the optimum operation with respect to this input example is ↓ (Move blank to next block on bottom), and the prediction probability is 66%. In this manner, unknown attribute was made to be predicted from a plural number of equivalent examples, thereby permitting high precision and certainty in prediction.

A comparison was made between this embodiment and the method using conventional techniques, as shown in FIG. 3, on the eight puzzle, by experiments. From the result of such comparison, it was confirmed that this embodiment reduces the prediction error to less than a half when compared to that by the conventional method.

Figure 15:
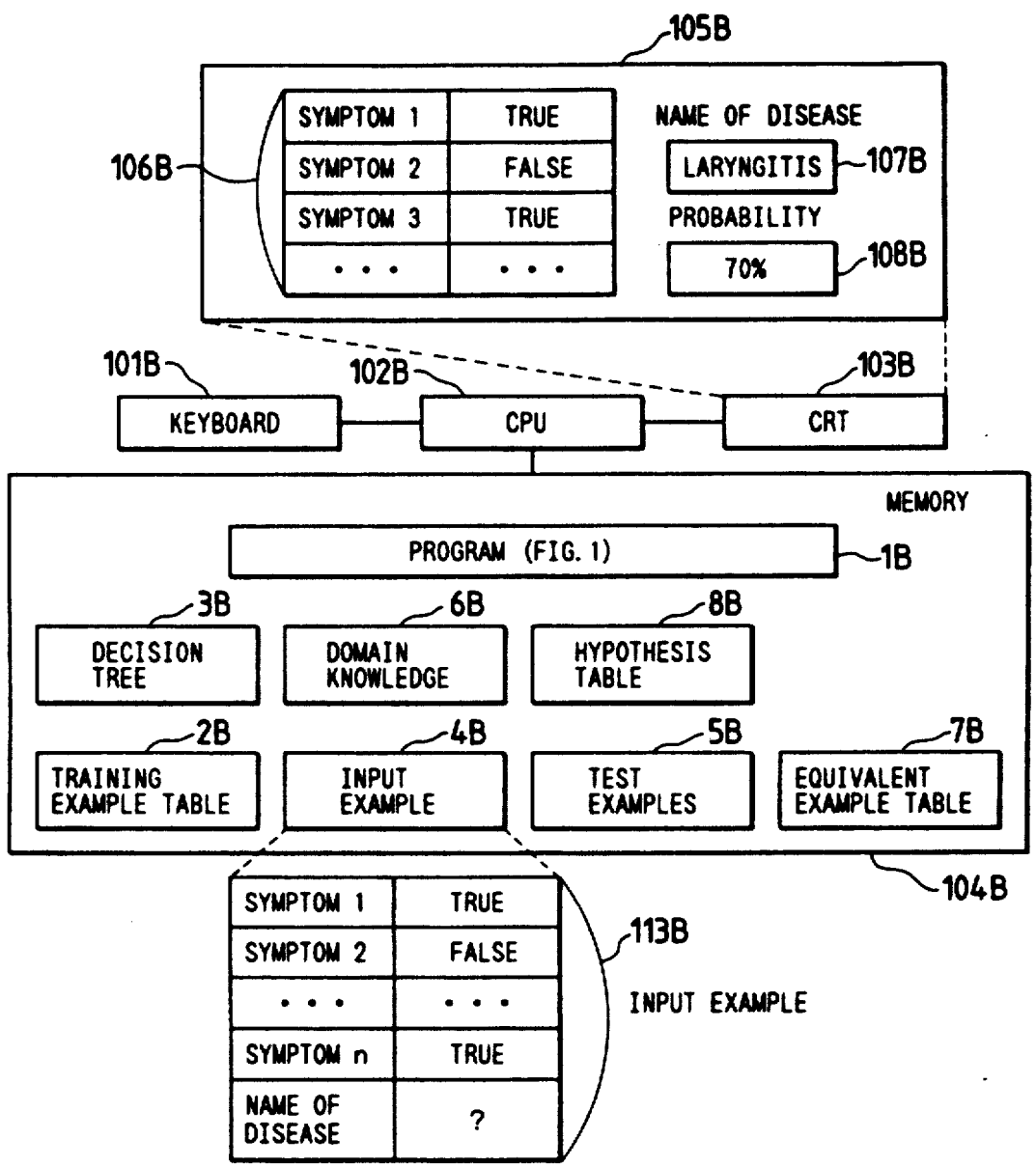
FIG. 15 is a diagram showing the second embodiment of the present invention.

Next, the second embodiment of the present invention will be explained by using FIG. 15. In the figure, the reference number with suffix B is equivalent to the same reference number without suffix B in FIG. 2.

This embodiment represents an embodiment of the present invention in the knowledge processing field. From data 113B of symptoms which is given by input example 4B, the name of disease 107B is predicted, and certainty of such prediction is displayed as 108B.

Training example table 2B is a set of training example and its classification class, consisting of symptoms and name of disease at that time. Further, domain knowledge 6B expresses knowledge specific in medical field. For instance, in the case of certain symptoms, including symptom 1, the name of disease is "a". Then, in the case of certain symptoms, lacking symptom 1 only, the name of disease is "b".

Program 1B predicts name of disease 107B, unknown attribute value of input example 4B, through the same processing as that described in the first embodiment, by use of domain knowledge 6B and input example 4B, and displays it on CRT 103B, together with its probability 108B.

Figure 16:
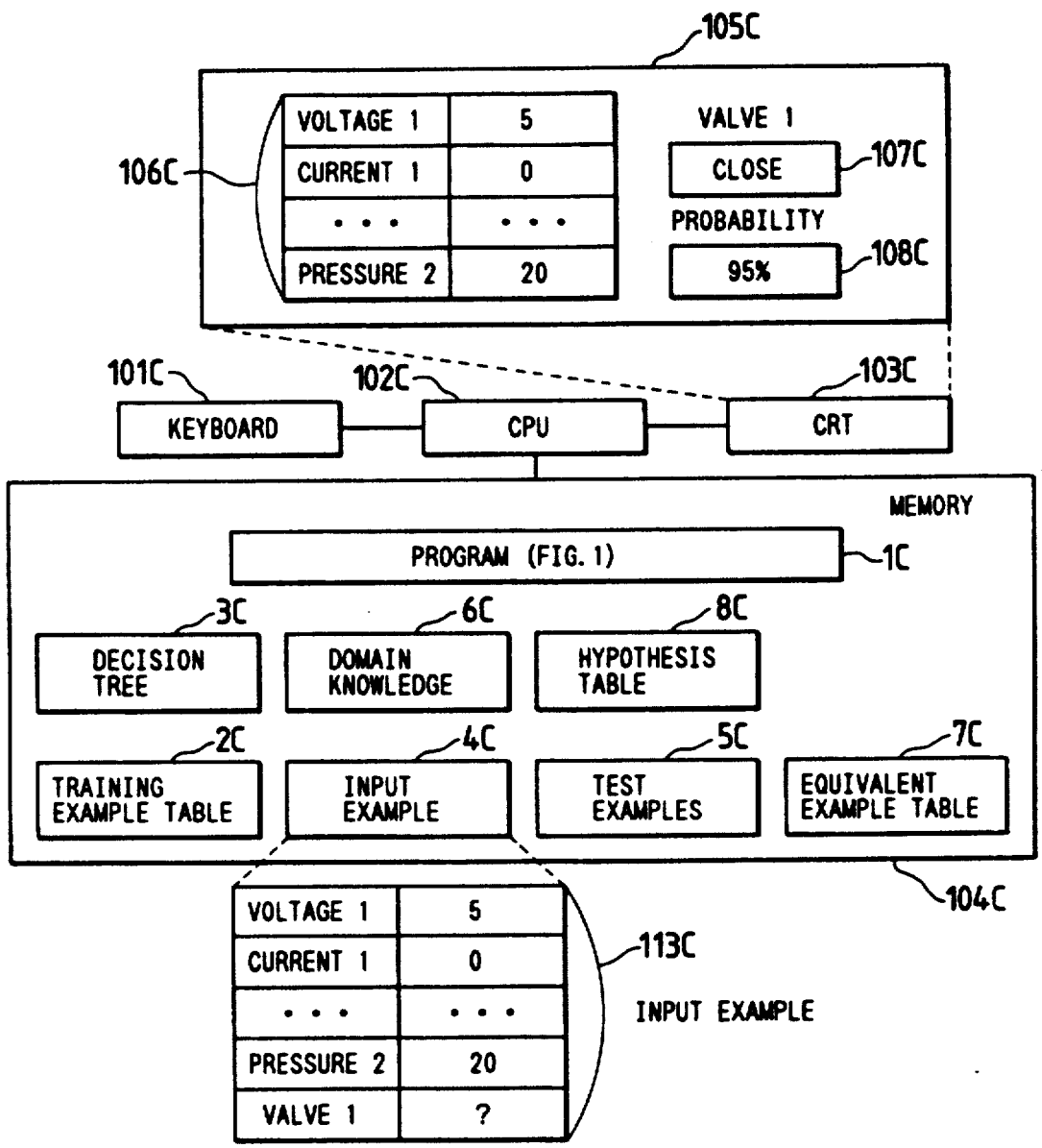
FIG. 16 is a diagram showing the third embodiment of the present invention.

Next, the third embodiment of the present invention will be explained by using FIG. 16. In the figure, the reference number with suffix C is equivalent to the same reference number without suffix C in FIG. 2.

This embodiment represents an embodiment of the present invention in the system control field. From data 113C of system condition which is given by input example 4C, the optimum operation 107C at that time is predicted, and certainty of such prediction is displayed as 108C.

Training example table 2C is a set of training example and its classification class, consisting of system conditions and the optimum operation at that time. Further, domain knowledge 6C expresses knowledge specific in such system. For instance, when voltage 1 is 3 or more and current 1 is 0, valve 1 is closed. Then, when current 1 is 5 or more, valve 1 is opened.

Program 1C predicts the optimum operation (valve 1) 107C, unknown attribute value of input example 4C, through the same processing as that described in the first embodiment, by use of training example table 2C, domain knowledge 6C and input example 4C, and displays it on CRT103C, together with its probability 108C.

According to the present invention, it is possible to increase prediction precision with respect to test example, thereby having effects of increasing prediction precision with respect to unknown attribute value of input example.

Further, according to the present invention, it is possible to quantitatively know the degree of certainty of test example prediction from the prediction results of test example and a plural number of equivalent examples, thereby having effects of knowing probability of prediction with respect to unknown attribute value of input example.

What is claimed is:

1. A system of predicting attribute value in a learning system, comprising:

first memory means for storing a plural number of training examples, each of which contains at least one attribute, an attribute value corresponding to said attribute, and a classification class assigned to each training example;

second memory means for storing domain knowledge for generating second examples, each having a classification class, from first examples, each having a classification class; and processing means including;

means for generating test examples being supplemented with candidates of a plural number of attribute values from inputted examples inputted by input/output means, said examples having at least a lacked attribute value, said candidates being expected by consulting said domain knowledge stored in said second memory means, means for generating equivalent examples each having a pair of expected value and a classification class, by consulting said domain knowledge stored in said second memory means, said equivalent examples being expected to be equivalent to said example of the lacked attribute value, and means for predicting the lacked attribute value of the above test example by use of the expected value and the classification class of the above equivalent example and said training examples stores in said first memory means.

2. A system according to claim 1, further comprising:
   means for producing data for predicting classification class of examples from said plural number of training examples stored in said first memory means.

3. A system according to claim 2, wherein said data for predicting classification class is a decision tree.

4. A system according to claim 1, further comprising:
   means for determining a degree of certainty of the lacked attribute value, as predicted above, by use of said expected value and said classification class of said equivalent examples generated by said equivalent examples generated means.

5. A system according to claim 1, wherein the attribute of each of said training examples further comprises attribute descriptions expressing conditions of an object system and attribute descriptions expressing optimum operation in said conditions.

6. A system according to claim 1, wherein the attribute of each of said training examples further comprises attribute descriptions expressing conditions of an object system and attribute descriptions expressing causes of said conditions.

* * * * *